(12) United States Patent
Gutta

(10) Patent No.: US 7,840,980 B2
(45) Date of Patent: Nov. 23, 2010

(54) INCORPORATION OF LEAD ACTOR INFORMATION FOR TV RECOMMENDERS

(75) Inventor: Srinivas Gutta, Veldhoven (NL)

(73) Assignee: Koninklijke Philips Electronics N.V., Eindhoven (NL)

(*) Notice: Subject to any disclaimer, the term of this patent is extended or adjusted under 35 U.S.C. 154(b) by 709 days.

(21) Appl. No.: 11/718,398

(22) PCT Filed: Nov. 1, 2005

(86) PCT No.: PCT/IB2005/053560
§ 371 (c)(1),
(2), (4) Date: May 2, 2007

(87) PCT Pub. No.: WO2006/048820
PCT Pub. Date: May 11, 2006

(65) Prior Publication Data
US 2009/0043725 A1    Feb. 12, 2009

Related U.S. Application Data

(60) Provisional application No. 60/624,888, filed on Nov. 4, 2004.

(51) Int. Cl.
G06F 3/00 (2006.01)
G06F 13/00 (2006.01)
G06F 17/00 (2006.01)
H04N 5/445 (2006.01)
G06N 7/04 (2006.01)

(52) U.S. Cl. ............ 725/46; 706/54; 725/48

(58) Field of Classification Search ............ None
See application file for complete search history.

(56) References Cited

U.S. PATENT DOCUMENTS

| | | | |
|---|---|---|---|
| 6,608,930 B1 | 8/2003 | Agnihotri et al. | |
| 6,642,939 B1 * | 11/2003 | Vallone et al. | 715/721 |
| 6,698,020 B1 * | 2/2004 | Zigmond et al. | 725/34 |
| 6,727,914 B1 | 4/2004 | Gutta | |
| 7,242,988 B1 * | 7/2007 | Hoffberg et al. | 700/28 |
| 7,367,043 B2 * | 4/2008 | Dudkiewicz et al. | 725/138 |
| 2001/0051037 A1 * | 12/2001 | Safadi et al. | 386/83 |
| 2003/0002850 A1 | 1/2003 | Shinohara | |
| 2003/0093790 A1 * | 5/2003 | Logan et al. | 725/38 |
| 2004/0003403 A1 * | 1/2004 | Marsh | 725/53 |
| 2004/0221308 A1 * | 11/2004 | Cuttner et al. | 725/46 |
| 2005/0210501 A1 * | 9/2005 | Zigmond et al. | 725/32 |

OTHER PUBLICATIONS

"Method and Apparatus for Generating Recommendation Scores Using Implicit and Explicit Viewing Preferences", U.S. Appl. No. 09/666,401.
"Three-Way Media Recommendation Method and System", U.S. Appl. No. 09/627,139.
Hua et al, "Automatic Location of Text in Video Frames", Proceedings of the 2001 ACM Workshops on Multimedia: Multimedia Information Retrieval, pp. 24-27.

* cited by examiner

Primary Examiner—Brian T Pendleton
Assistant Examiner—Ryan Stronczer

(57) ABSTRACT

A program recommender (300) that receives one or more starring actor data fields for a program. The recommender adjusts one or more of the received starring actor data fields (600) by utilizing a source separate from the received starring actor data fields to identify one or more starring actors in the program. The adjusted data fields may be made available for use in creating a viewer profile (400), or alternatively may be made available for determining a recommendation (330) for the program.

13 Claims, 3 Drawing Sheets

Figure 1:
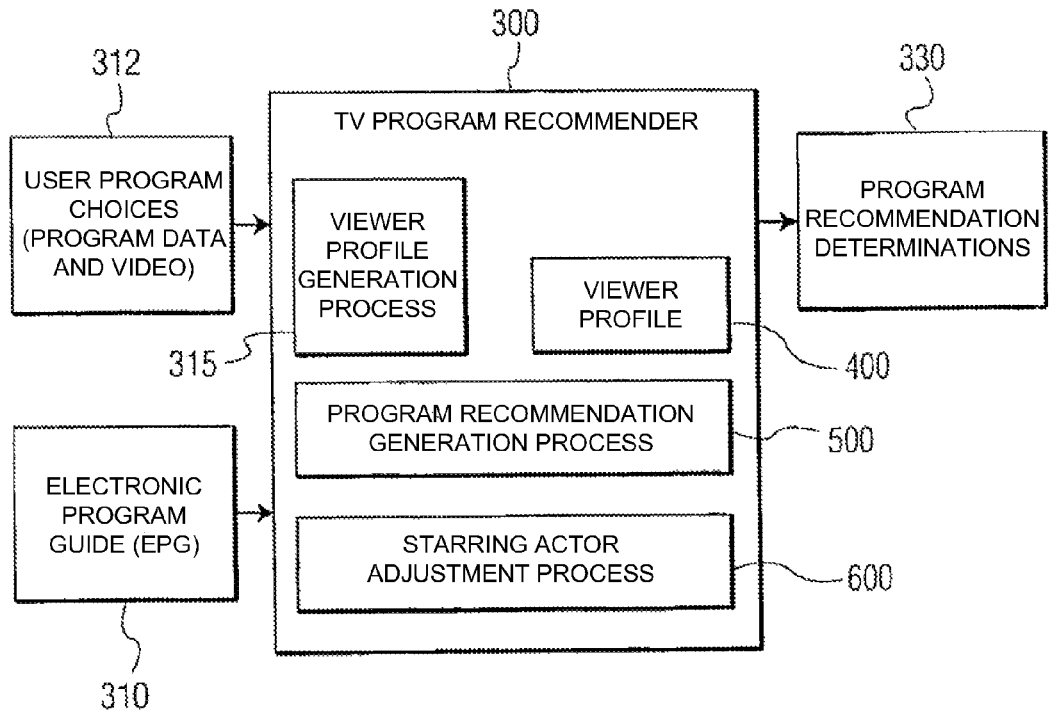

| RANK | RECEIVED STARRING ACTOR FIELDS | IDENTIFIED LEAD ACTOR (text-based technique) | ADJUSTED STARRING ACTOR FIELDS |
|---|---|---|---|
| 1 | Tom Cruise | Aidan Quinn | Aidan Quinn |
| 2 | Nicole Kidman | | Nicole Kidman |
| 3 | Aidan Quinn | | Aidan Quinn |
| 4 | John Goodman | | John Goodman |

FIG. 2A

| RANK | RECEIVED STARRING ACTOR FIELDS | IDENTIFIED LEAD ACTOR (text-based technique) | ADJUSTED STARRING ACTOR FIELDS |
|---|---|---|---|
| 1 | Tom Cruise | Aidan Quinn | Aidan Quinn |
| 2 | Nicole Kidman | | Tom Cruise |
| 3 | Aidan Quinn | | Nicole Kidman |
| 4 | John Goodman | | John Goodman |

FIG. 2B

| RANK | RECEIVED STARRING ACTOR FIELDS | IDENTIFIED LEAD ACTOR (text-based technique) | ADJUSTED STARRING ACTOR FIELDS |
|---|---|---|---|
| 1 | Tom Cruise | Nicole Kidman | Nicole Kidman |
| 2 | Nicole Kidman | Aidan Quinn | Aidan Quinn |
| 3 | John Goodman | | Tom Cruise |
| 4 | Harvey Keitel | | John Goodman |

FIG. 2C

INCORPORATION OF LEAD ACTOR INFORMATION FOR TV RECOMMENDERS

The invention generally relates to TV and other recommenders. More particularly, the invention relates to improvements in recommenders, including pre-processing of certain information used in constructing the viewer profile and pre-processing of certain information provided to the recommender for making a recommendation.

Television recommenders have been an active area of research and development, with many techniques and devices currently available. Recommenders generally process programming information such as that supplied by an electronic program guide (EPG) and suggest those programs that might be liked by the user. Such recommendations are typically based on certain preferences of the user regarding program attributes that are determined, stored and utilized by the recommender when evaluating available programs. The list of preferences or recommendation rules developed by a recommender for a user is typically referred to as a viewer profile.

User preferences stored and applied by a recommender can also indicate those types of programs that a user would not like (essentially a negative preference). Programs that the recommender determines a user would not prefer may either be eliminated from further consideration (i.e., not presented to the user), or may be presented with a negative indication to the user (a "negative" recommendation).

Recommenders may be broadly divided into a number of categories. One general type of recommender may be generally categorized as "implicit" television program recommenders. Implicit television program recommenders generally generate a viewer profile in a non-obtrusive manner based on information derived from the viewing history of the user, and base subsequent television program recommendation determinations on the viewer profile. Still other types of recommenders may generally be categorized as "explicit" television program recommenders. Explicit television program recommenders explicitly question users about their preferences for program attributes, such as title, genre, actors, channel and date/time, to derive viewer profiles and generate recommendations. The explicit television program recommender processes the user feedback in a known manner to generate a viewer profile containing a set of rules that implement the preferences of the user, which are used in providing subsequent program recommendation determinations.

Aspects of different categories of recommenders may also be combined into a single recommender. For example, a single recommender may develop a viewer profile via implicit and explicit preferences as described above. Where there is a conflict between preferences developed implicitly and explicitly, the recommender rules may select the explicit preference, or average the two for example. Input programs would thus be evaluated based upon a composite of implicit and explicit preferences. Description of a composite recommender may be found in the co-pending and commonly owned U.S. patent application Ser. No. 09/627,139 entitled "Three-Way Media Recommendation Method and System" having inventors Schaffer, Lee and Gutta, filed Jul. 27, 2000, the entire contents of which are hereby incorporated by reference herein. Another composite recommender is described in the co-pending and commonly owned U.S. patent application Ser. No. 09/666,401 entitled "Method and Apparatus for Generating Recommendation Scores Using Implicit and Explicit Viewing Preferences" having inventors Kurapati, Schaffer and Gutta, filed Sep. 20, 2000, the entire contents of which are hereby incorporated by reference herein.

While existing television recommenders identify programs that may (or may not) be of interest to a given user, they suffer from a number of limitations, which if overcome, could further improve the quality of the generated program recommendation determinations. For example, recommenders usually rely on the data provided with the program for determining preferences. Such data is typically provided by the service provider or is included together with the program video itself (e.g., metadata). Such unquestioned reliance by the recommenders on the received data may result in an incorrectly identified preference and recommendations (or non-recommendations).

As a particular example, metadata for a particular movie being viewed by a user may identify the actors as Tom Cruise and Nicole Kidman. In an implicit type recommender, the recommender may utilize the movie genre and actors Tom Cruise and Nicole Kidman as positive attributes in developing a preference profile. However, the user's favorite actor Aidan Quinn may actually be the lead (or a prominent) actor in the movie, but not included in the metadata. Thus, the recommender does not capture important information regarding a user's favorite actor in developing the user profile. Consequently, when the EPG subsequently includes a program identifying one of the actors is Aidan Quinn, the recommender may not recommend the program to the user.

In addition, the order of the names of actors provided in the metadata or other programming data by the service provider typically has no particular relevance to the prominence of the role for the actor. Thus, even if Aiden Quinn were listed for the above movie example, his name may appear in a fifth actor field when he is actually the lead actor in the movie. If the recommender utilizes only the first two actor fields in developing user preferences, or in making recommendations, for example, a similar result as described above may again occur.

In addition, in similar manner a recommender evaluating programs received in an EPG may also rely on actor data and/or ordering provided. Exclusion, improper inclusion and/or misranking of actor data for the program in the EPG may result in an improper evaluation of the program by the viewer profile, thus potentially giving an incorrect positive or false negative recommendation determination.

Among other things, the present invention includes a television program recommender that uses a separate source apart from data received for a program to identify one or more starring actors in the program, and adjusts the starring actor data received for the program to include the separately determined actor(s). The separately identified actor(s) may simply replace the actor data received for the program. As an alternative example, the recommender may first determine whether to adjust the received actor data. For example, the recommender may first determine whether a separately identified starring actor is missing from data received for the program and, if so, adjust the received data to include the missing actor. For example, the missing actor may replace one of the actor fields in the received data, or the missing actor may be included in a new field. The recommender may also determine whether a separately identified starring actor is misranked in the data received for the program and, if so, adjust the received data to properly rank the actor.

The program data may be received with a program that is used by the recommender in creation of a viewer profile. Thus, it may be received along with the video of a program that the user has chosen to watch, for example. There are a number of ways to separately identify starring actor data (and rank, where applicable) For example, for a program currently being viewed by the user, the recommender (or another module) may monitor the program's introductory text, identify key words such as "starring", and identify a name or names associated therewith. In addition, the order of appearance of the names in the video may be accepted as reflecting the rank of the named actors. Alternatively, a separate database including program data and known to have acceptable accuracy may be consulted for actor names and ranks.

Adjusted actor data for a program will typically appear the same as received data for subsequent processing by the recommender. (If a new actor data field is added, the recommender is programmed to recognize it.) Thus, the recommender may utilize adjusted actor data in the same manner as it otherwise would for actor data as received for the program when creating a viewer profile. Subsequent processing by recommender for creating a viewer profile may thus incorporate a technique of a conventional recommender (e.g., a known implicit, explicit, etc. recommender). Adjusting data for programs to more accurately reflect the starring actors allows the recommender to provide a more accurate viewer profile.

Thus, in one aspect, the invention comprises a program recommender that receives one or more starring actor data fields with a program. The recommender adjusts one or more of the received starring actor data fields by utilizing a source separate from the received starring actor data fields to identify one or more starring actors in the program. In another aspect, the invention comprises a method for processing data regarding a received program for use with an automated television recommender. According to the method, a separate information source containing starring actor information is accessed. The separate information source is used to determine whether it identifies one or more starring actors in the program received. If so, the received data is adjusted using one or more of the identified starring actors. The adjusted received data for the program is made available for use in the creation of a viewer profile.

The invention also comprises a recommender that performs a like adjustment of programming information received (such as via an EPG) that is used to make recommendations based upon a user profile. In like manner, the actor data received with a program listing may, be adjusted to include separately identified actor data, which may also include a determination that the information is missing or improperly ranked in the received data. The recommender can then utilize the re-cast data for the program in determining whether the program is recommended to the user. Improving the accuracy of the starring actor data included for programs in the EPG allows the accuracy of the recommendation determination to be improved.

Thus, a further aspect of the invention comprises a method for processing electronic programming data received for a program for use in automated television program recommendations. According to the method, a separate information source containing starring actor information is accessed. It is determined whether the separate information source identifies one or more starring actors in the program. If so, the received electronic programming data is adjusted using one or more of the identified starring actors. The adjusted electronic programming data received for the program is made available for use in determining an automated recommendation of the program.

It is also noted that the re-ordering of starring actors may also serve to eliminate actors having lesser roles from consideration by the recommender in creating the user profile, thus enhancing the integrity of the profile. (For example, a lesser actor is not likely to be the focal point of the user's selection of a program.) Similarly, adjusting actors in the EPG data may avoid an incorrect or disappointing recommendation to a user, and may also lead to a recommendation that might otherwise be bypassed.

Although aspects of the invention have been summarized above as part of the recommender, many different configurations may be used in implementing the invention, as noted below.

Among other things, for convenience the term "actor" is universally adopted herein to refer to both actors and actresses. Also, the term television "program" is used generically throughout and is meant to include anything that is broadcast, including movies, shows, infomercials, or the like. The order of actors provided by a source (including received programming data, such as metadata) will generally be referred to as the actor ranking, with the first actor being referred to as the lead or highest ranked actor, and the second, third, etc. listed actors being referred to as lower ranked actors. Also, as noted above, a recommender may utilize data for both selected and non-selected programs in creating a viewer profile, and the viewer profile may consequently include both positive and negative preferences. Likewise, recommendation determinations made by certain recommenders for a program under consideration may be both positive and negative, and the user may be informed of both types.

Figure 1A:
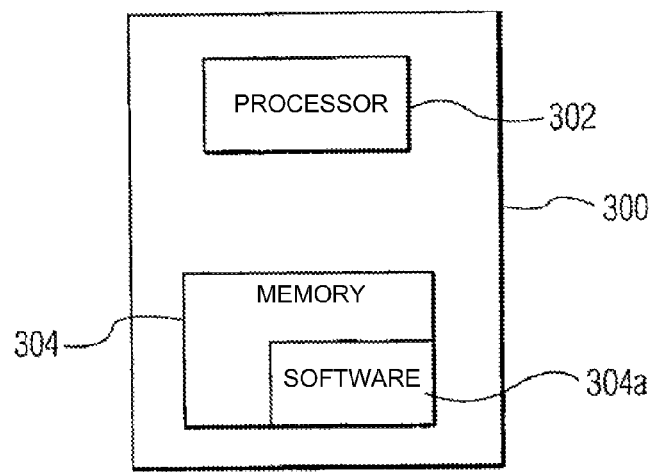
Figure 3:
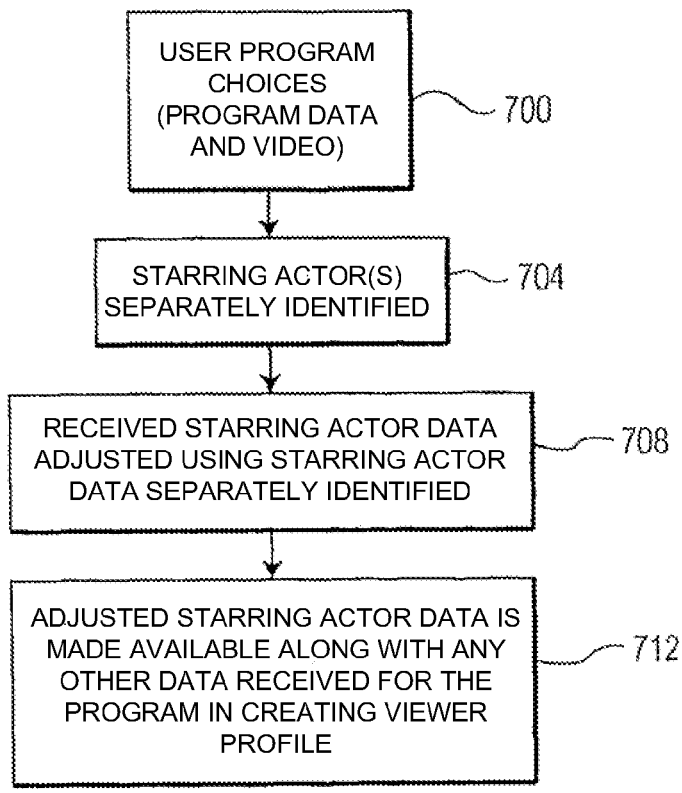
Figure 4:
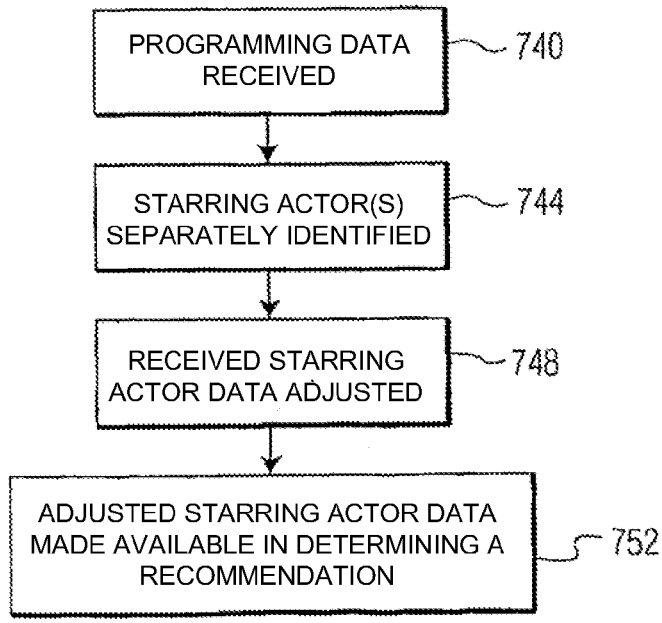

FIG. 1 illustrates an exemplary embodiment of a recommender in accordance with the invention;

FIG. 1*a* is a representative diagram of a different level of the recommender of FIG. 1;

FIGS. 2*a*-2*c* illustrate examples of an adjustment of received starring actor fields according to various embodiments of the invention;

FIG. 3 illustrates a processing method used in creating a viewer profile in accordance with an embodiment of the invention; and FIG. 4 illustrates a processing method used in processing program information in determining a program recommendation in accordance with an embodiment of the invention.

FIG. 1 illustrates an exemplary embodiment of a recommender 300 in accordance with the invention. In FIG. 1, the recommender 300 is comprised of a number of separately-depicted modules. Generally, viewer profile generation process module 315 processes a user's programming choices (user program choices input 312, which includes pertinent program data and video) to create viewer profile 400. Viewer profile generation process module 315 may use both positive and negative program choices of the user that are input via input 312 (i.e., those programs selected for viewing as well as those chosen not to view). Program recommendation generation process module 500 generally receives input regarding programming data (such as via EPG input 310) and, in consultation with viewer profile 400, outputs program recommendation determinations 330 to a user. Recommendations output to a user will generally include suggested programs (positive recommendations) but may also indicate that a program(s) is not recommended (negative recommendations). As described in more detail below, recommender 300 also includes starring actor adjustment process module 600, which pre-processes starring actor data relating to user program choices 312 and/or EPG 310 before further processing by viewer profile generation process module 315 and/or program recommendation generation process 500, respectively.

Recommender 300 (and in particular, the various modules shown in FIG. 1 and described above) may be embodied in any computing device, such as a PC, workstation, set-top box, television circuitry, or the like. Modules included in recommender 300 thus in general may reside in one or more processors and associated memory. For example, FIG. 1a provides a representative embodiment of the hardware and software components of recommender 300 that support the modules represented in FIG. 1. Thus, the modules of FIG. 1 may reside in software 304a of memory 304 of FIG. 1a and the processing of the modules may be performed by the processor 302 in conjunction with the associated memory 304 and software 304a of FIG. 1a. (As a more particular example, various aspects of embodiments of the starring actor adjustment process module 600 discussed below (such as text and image detection and recognition, adjustment of data fields, etc.) may be stored in software 304a, and be applied using processor 302 and associated memory 304.)

Techniques used by the viewer profile generation process 315 of recommender 300 in creating the viewer profile 400 and the program recommendation generation process 500 (which generally operates in conjunction with viewer profile 400) may be in accordance with one or a combination of techniques that are well-known or conventional in the art. Thus, the viewer profile generation process 315, viewer profile 400 and program recommendation generation process 500 may adopt such processing from one or a combination of conventional explicit program recommenders, implicit program recommenders, and other program recommenders. For example, viewer profile generation process 315, viewer profile 400 and program recommendation generation process 500 may utilize the decision tree processing techniques described in U.S. Pat. No. 6,727,914 B1 entitled "Method and Apparatus for Recommending Television Programming Using Decision Trees", of inventor Srinivas Gutta, issued Apr. 27, 2004, the entire contents of which are hereby incorporated by reference herein (and referred to as the "'914 patent"). The '914 patent utilizes data of shows that a user has viewed (or chosen not to view) to classify a number of program attributes. A hierarchical decision tree is created, where the attributes selected for nodes are determined by relative entropy measures for the attributes, and each leaf node provides either a positive or negative recommendation for a program corresponding to the particular branch. Such processing and the resultant decision tree may be incorporated as the viewer profile generation process 315 and viewer profile 400, respectively. The decision tree is thereafter applied to make program recommendations, corresponding to program recommendation generation process 500. Whatever techniques are incorporated in the recommender 300 of this embodiment, as described further below starring actors in at least some programs are used by viewer profile generation process 315 in creation of the viewer profile 400 and/or starring actors are used for at least some programs listings in the program recommendation generation process 500.

Focusing first on viewer profile 400, as noted this is created by viewer profile generation process 315 of recommender 300 based on programs elected for viewing (and for certain recommenders, not viewed) by the user. This program data is represented as input in FIG. 1 by user program choices 312, which includes pertinent program data and video. Thus, recommender 300 generally monitors the programs viewed by the user input via block 312 and utilizes the data (either directly, or after certain pre-processing described below) in viewer profile generation process 315 in the creation of viewer profile 400. Where the recommender 300 implements the decision tree technique of the '914 patent, the input program data (including the data as pre-processed) comprises the attributes and positive and negative examples utilized in creating the nodes and leaves of the tree.

Much of the program data regarding viewed (as well as non-selected) programs input at block 312 may be directly utilized by viewer profile generation process 315 in creating the viewer profile 400 according to the conventional technique utilized. This may include program genre, time of day and channel, among many other program attributes. However, portions of the received data may first be adjusted and/or new data may be added by starring actor adjustment processes 600. For example, where the received data of a program (such as metadata) input in block 312 includes starring actor fields, the starring actor adjustment process module 600 is applied before the actor data is processed further by the viewer profile generation process 315 of recommender 300. In that case, module 600 may analyze the video input available at block 312 for the program for a period of time. For example, text detection and recognition may be applied to the video for 3 minutes, corresponding approximately to the duration of an introductory credit portion of a program, and used to identify one or more starring actors. Similarly, the last three minutes of the program may likewise be monitored, where closing credits typically appear.

Detection and recognition of text in the considered portions of the video may utilize any one or a combination of known or conventional techniques. For example, certain techniques may be adopted and adapted from U.S. Pat. No. 6,608,930 B1 entitled "Method And System For Analyzing Video Content Using Detected Text In Video Frames", inventors Agnihotri et al., issued Aug. 19, 2003, the entire contents of which are hereby incorporated by reference herein (and referred to as the "'930 patent"). Thus, starring actor adjustment process 600 may adopt techniques from the '930 patent relating to text detection and recognition, for example, to monitor the beginning or ending video of the program for credit text as noted above. (In addition, pertinent text attribute features used for identifying program credits (such as scrolling text, identifying keywords such as "starring", etc.) may also be adopted from the '930 patent to confirm that the detected text corresponds to program credits.)

As an alternative, starring actor adjustment process module 600 of recommender 300 may substitute the text detection technique described in "Automatic Location Of Text In Video Frames", by Xian-Shang Hua, Xiang-Rong Chen, Liu Wenyin & Hong-Jiang Zhang, Proceedings of the 2001 ACM Workshops on Multimedia: Multimedia Information Retrieval, pp. 24-27 (ACM Press 2001), the entire contents of which are hereby incorporated by reference herein.

After detecting and recognizing credit text in this manner, adjustment process 600 may adapt it to identify starring actors included in the text. Thus, adjustment process 600 may, for example, confirm that the text includes names by comparing the text with names in a name database (which may specifically include actor names). Adjustment process 600 may select a lead actor based on one or more selection rules. Rules for such analysis may be as simple as determining whether the detected text includes the word "starring" adjacent to a name. According to other (or additional) rules, the text may be monitored to determine the first name that appears in text in the program video, or the name having the largest size, which typically corresponds to the lead actor.

Having so identified the lead actor from the video for the program using text-based techniques, the starring actor adjustment process 600 may simply replace the first name in the received starring actor fields with the identified lead actor. FIG. 2a provides an example of this basic process, where separately identified lead actor (Aidan Quinn, identified via text analysis of the program's video) simply replaces the first ranked actor in the received starring actor fields (Tom Cruise). The resulting adjusted starring actor fields comprise a more accurate lead actor. The adjusted starring actor fields thus appear in the same form as the received starring actor fields, and are made available to viewer profile generation process 315 for use with the other input data for the program in creating viewer profile 400.

In the particular example shown in FIG. 2*a*, the accuracy of the lead actor field is improved, but Aidan Quinn is also named third in the adjusted data and the received actor data for Tom Cruise is lost. Alternatively, additional processing may occur before names are replaced. For example, the identified lead actor name may first be compared with the received names to determine whether any received names should be adjusted. If the identified lead actor name does not appear among the received actors, the name of the identified actor is inserted in the first field, the received names are all moved down one rank, and the lowest received name is dropped. If the identified actor appears in the first received actor field, no adjustment is needed. If the identified actor appears at a lower ranked received field, the name is removed from the lower field and all higher ranked names received are each shifted down one rank. This serves to shift the vacated field position to the first field, and the identified actor name is inserted in the first field. FIG. 2*b* exemplifies such a procedure for the scenario of FIG. 2*a*. In FIG. 2*b*, identified actor Aidan Quinn is recognized as also appearing in the third received field. His name is therefore dropped from the third field, the first and second received names (Tom Cruise and Nicole Kidman) are shifted to the second and third fields, respectively, Aidan Quinn's name is inserted in the first field, and the name in the fourth field (John Goodman) remains unchanged. (Thus, Aidan Quinn's name is effectively shifted in rank from the third to first position.) Thus, the lead actor in the adjusted data more accurately identifies Aidan Quinn as the lead actor while also maintaining the identity and relative rankings of the other actors according to the received fields.

Other comparison and replacement rules will be readily apparent to one skilled in the art, depending on the relative priority to be given to the data. As noted above and also demonstrated in the outcome shown in FIG. 2*b*, the adjusted starring actor fields appear in the same form as the received starring actor fields, and are made available to viewer profile generation process 315 for use with the other input data for the program in creating viewer profile 400. By including program data that more accurately reflects the actual lead actor for the program, recommender 300 is capable of creating a more accurate viewer profile 400 and may subsequently make more accurate recommendation determinations using that profile.

It is noted that the exemplary embodiment described above relies on detecting credit text in the video for the first few minutes after a user tunes in to a program. This relies on the user tuning in as the program is beginning. If the user tunes in after the opening credits, for example, no text is detected, and the unaltered starring data fields received with the program are made available to the viewer profile generation process 315 in developing the viewer profile 400. (A similar result may occur if the program's ending credits may be used, but are not detected.) Alternatively, where no text is detected or recognized, starring actor adjustment process 600 may consult an internal or external database listing programs and corresponding starring actor data. (Such an internal database may also be in memory 304 of FIG. 1*a*, for example.) Starring actor data for programs included in such a database may be previously compiled using text-based analysis of the video as described above, they may be manually entered by trained employees of a service, etc. Adjustment process 600 may determine whether the database includes the program under consideration (which generally is identified to recommender 300 by a received title data field). If so, the lead actor may be identified for the program in the database and utilized as described above for a textually-based identification. It is noted that adjustment process 600 may utilize the database as an alternative to the text determination of potential lead actors. Also, such a database may also be used in conjunction with the text-based identification, with appropriate decision rules when there is conflicting text-based identification of a potential lead actor.

Alternative to (or in addition to) the above-noted techniques for identifying a starring actor separate from the starring actor data received with the program (e.g., metadata or the like), starring actor adjustment process 600 of recommender 300 may apply a well-known face recognition technique to the video of the program to identify actors. For example, a sample of the video for the program may be monitored and facial images captured using well-known techniques. Those faces may be identified by comparison with a database of actors' faces available to the starring actor adjustment process 600. The lead actor (and lesser actors) may be selected, for example, based on time of appearance in the sampling.

Alternative to replacing the lead name in the starring actor data field received, the name of the leading actor determined in the video by text-based techniques (or other determination) may be put into a new data field called the "lead actor" field by starring actor adjustment process 600. In that case, viewer profile generation process 315 is programmed to utilize the lead actor field when filled in the same manner that it would use the first of the starring actor data fields received with the program in creating the viewer profile 400. In addition, where the viewer profile generation process 315 is capable of utilizing starring actors as an attribute in determining the viewer profile, but a received program does not include starring actor data fields, adjustment process 600 may identify a lead actor as described above and create a starring actor field for the program for use in developing viewer profile 400.

It is noted that preferably viewer profile generation process 315 is generally programmed to utilize the identities and ranks of adjusted starring actors for a program when appropriate in creating a more accurate the viewer profile 400. However, viewer profile generation process 315 does not necessarily use all data for any one particular program choice of a user in creating the viewer profile 400. Thus, for a particular program input via block 312, viewer profile generation process 315 may not necessarily use adjusted starring actor fields for the program as adjusted and/or created by starring actor adjustment process 600. Further, many conventional recommenders also utilize the attributes of programs that are not selected for viewing by a user in the creation of viewer profile 400, which essentially creates negative preferences. Such negative preferences in the viewer profile 400 can be used to evaluate subsequent programs in making no recommendation or an explicitly negative recommendation. Where viewer profile generation process 315 of recommender 300 constructs the viewer profile 400 using non-selected programming, starring actor adjustment process 600 may adjust the starring actor data fields for those non-viewed programs in like manner as for the viewed program described above. For example, where a text-based analysis of the video signal is used to determine a starring actor, starring actor adjustment process 600 may be capable of simultaneously monitoring video signals of the selected program and one or more non-selected programs. By more accurately reflecting the starring actors in the non-selected programs, the viewer profile 400 created once again more accurately reflects the user's likes and dislikes.

In like manner, starring actor adjustment process 600 may separately identify more than one actor name for a received program and utilize them to adjust received starring actor fields. The multiple identified actors may be used to replace the named actors in received data fields for the program, used to populate vacant fields, or placed in newly created fields. As shown in FIGS. 2a and 2b, there may be four actors named in the received starring actor fields which may potentially be replaced with separately identified actors. (Although four are used in these examples, there may be more or less. The Tribune Media Service, for example, reserves a total of 6 fields for actor names.) For example, in a manner analogous to those described above, video of a program may be analyzed to identify text containing two starring actor names. The rank of the identified actors may also be taken as being in the order detected in the video. Adjustment process 600 may replace the two names appearing in the first and second received data fields with the respective identified actors. In like manner, more than two names may be identified and used to replace the received names.

Other aspects described above may also be utilized where starring actor adjustment process 600 identifies multiple starring actor names. For example, the identified names may be checked in a database to confirm that they are actually the names of actors before replacing received data fields. Also, the received names may be moved down in rank by the number of identified names, so that the identified names effectively replace the lowest ranked names received. In addition, the identified names may first be compared with the received names and the comparison results used in the adjustment. For example, each identified name appearing as a received name may be removed from its received name field. The remaining received names of higher rank are pushed down in sequence to fill any lower fields vacated, while also clearing the needed number of the highest fields for insertion of the identified actor names. If necessary (i.e., when less than all of the identified names appear among the received names), received names in the lowest fields may be pushed out (dropped) to make sufficient room in the top fields.

For example, as shown in FIG. 2c, two identified actors Nicole Kidman and Aidan Quinn have identified ranks 1 and 2, respectively. By comparing received and identified names, it is recognized that identified actor Nicole Kidman also appears in received field 2. Nicole Kidman is therefore removed from received field two. The name in received field one (Tom Cruise) is moved down two fields to the field 3, thus leaving fields 1 and 2 vacant for inserting identified actors Nicole Kidman and Aidan Quinn, respectively. Tom Cruise pushes John Goodman from position 3 to position 4, and John Goodman pushes Harvey Keitel off the list. This exemplary replacement procedure for multiple actors identified gives priority to the identified actors and rankings, avoids duplication in the lower ranks, and preserves the ranking of the received actors in the lower ranks.

As in the case of one identified actor, the comparison of names may be used to first determine whether or not one or more of the received name fields needs to be adjusted. For example, the comparison may recognize when the name and rank of an identified actor is the same as the name and rank of a received actor, thus determining that no adjustment is needed for that field. The data in such a recognized field may be maintained while adjustments are made as needed for any other retrieved names. (In the methodology described immediately above, for example, higher ranked names being pushed down to make room for other identified names would skip such a field.) In the case where all identified names and ranks corresponded to their respective received names and ranks, the comparison may determine that no adjustment is needed.

As in the case of separately identifying one starring actor, other techniques apart from (or in addition to) text-based techniques may be used to identify multiple starring actors in the program, such as consulting a database. Also, the "lead actor" identified may be placed in a new data field, while the second, third, etc. actors identified may replace those in the received data fields. In addition, actors identified by adjustment process 600 may be used to populate vacant data fields received for a program, not just replace or reorder names in the received data fields. Also, replacement rules may readily cover the situation where more starring actors are identified than received data fields. (For the exemplary embodiment described above with respect to FIG. 2c, if five actor names were identified, the first four would appear in the four adjusted starring actor fields, unless additional data fields are created.) Similarly, where the recommender 300 programming is capable of utilizing starring actors as an attribute in determining the viewer profile, but a received program does not include starring actor data fields, adjustment process 600 may identify one or more starring actors using a separate source (e.g., text-based analysis of the program video) and create data fields for the program.

FIG. 3 is an embodiment that presents a basic exemplary methodology as it pertains to creation of a viewer profile. In block 700, user program choices (including program data and video) are received. In block 704, one or more starring actors are identified for a received program separately from any program data received in block 700. In block 708, starring actor data received with the program is adjusted utilizing identified starring actor data for the program in block 704. Such adjustment may be automatic or may selectively occur after a comparison between the names (and optionally the actor ranks) of received starring actors with identified starring actors. The adjusted data is made available for use with any other data received for the program in creation of the viewer profile in block 712.

As noted, adjusting (or adding) the starring actor data information to better reflect the lead actor (as well as secondary actors) allows recommender 300 to create a viewer profile 400 that better reflects the user's programming preferences, including negative preferences where applicable. Programs in the EPG 310 that are subsequently evaluated using that profile may result in more accurate recommendation determinations 330.

Starring actor data included for programs listed in EPG 310 may also be adjusted where appropriate in a manner similar to that discussed above for programs used in creating the viewer profile 400. Some (or all) programs included in EPG 310 may also include starring actor data, and program recommendation generation process 500 may be programmed to utilize such starring actor data in applying the viewer profile 400 to the prospective program listing. For example, where the viewer profile 400 comprises a decision tree according to the '914 patent, it may include nodes and branches for one or more actors. Thus, actor data for a program listing may be utilized in a node or branch of the decision tree in determining a recommendation for the program.

Higher accuracy of starring actor data included with prospective programs in the EPG 310 used with such recommenders will thus also result in more accurate recommendation determinations. In an additional (or alternative) aspect of the exemplary embodiment depicted in FIG. 1, the starring actor adjustment process 600 also initially operates on program data input to recommender 300 with the program listing via EPG 310. For example, the title and, when necessary, other program information (such as program genre) included with the listing is used to retrieve the program's starring actors from an external or internal database of programs containing starring actor data. (As for the database used in creating the viewer profile 400, starring actor data for programs included in such a database may be previously compiled using the text-based analysis of video techniques described above, they may be manually entered by trained employees of a service, etc.) Adjustment process 600 may determine whether the database includes the program under consideration and, if so, retrieve one or more starring actor names and, where applicable, actor ranking.

Adjustment process 600 may then adjust the starring actor data for the program listing to include the retrieved actor(s). For example, names received with the listing may be simply replaced with the retrieved names. Alternatively, each name retrieved for the program may replace the respective name received with the program based on rank. For example, if three names are retrieved and four names are received, retrieved names 1-3 may replace received names 1-3 and received name 4 will remain unchanged. Alternatively, analogous to the description above for adjustment of data used in creation of the viewer profile 400, adjustment process 600 may compare the received and retrieved names. The comparison may be used in adjusting the received names, including determining whether or not to adjust a name or names. (For example, adjustment process 600 for a program listing may use procedures analogous to those described above with respect to FIGS. 2b and 2c, where in this case received starring actor fields correspond to the program listing data and the retrieved actor names for the program listing are analogous to the identified lead actor or actors of FIGS. 2b and 2c.) If four or more names are retrieved in the prior example, the first four may replace all of the received names, or additional data fields may be created. In addition, adjustment process 600 may add retrieved names to vacant data fields in the programming data, or create new or additional fields for retrieved names.

Of course, the received starring actor data for a program listing may accurately reflect the retrieved actor data, or the database may not include the program. In that case, the original program data is used by program recommendation generation process 500 of recommender 300 in its normal fashion to provide a recommendation determination for the program 330. When adjustment process 600 adjusts actor data received with a program listing via EPG 310, the modified program data contains more accurate starring actor data, but is otherwise is in the same form. (If the form is changed, for example, by adding a new field to the listing that includes a retrieved name, program recommendation generation process 500 is programmed to recognize it.) Thus, the adjusted program listing data is likewise used by program recommendation generation process 500 with viewer profile 400 in its normal fashion to provide a recommendation determination 330 for the program. (In that regard, it is noted that preferably program recommendation generation process 500 and viewer profile 400 are generally configured to utilize the identities and ranks of adjusted starring actors in a program listing in rendering a recommendation determination 330 for the program. However, for any particular program listed, the program recommendation generation process 500 may not necessarily utilize included starring actor data, whether or not adjusted. In addition, process 500 may generate either no recommendation for a particular program or an explicitly negative recommendation in recommendation determination 330.)

In the particular embodiment given above with respect to adjustment of the EPG 310 program data, a database of programs is utilized for retrieving starring actors for the program and adjusting the program data received for the program in the EPG 310. However, other techniques may be used for identifying starring actor information separately from the program data received with the EPG 310. For example, adjustment process 600 may apply the above-described techniques of text-based analysis to the underlying video of programs listed in the EPG 310. The underlying video for a program may be accessed, for example, through one or more video archives accessed by the adjustment process. Because many programs are typically input via EPG 310, attempting to evaluate and adjust (or add) starring actor information in this manner for each listed program may be time consuming. Thus, adjustment process may first focus on movies beginning within one-half hour, and then expand the process to other programs. Alternatively, the EPG 310 provider may as a service conduct the initial credit text search for each program, and provide those particular video frames in order along with the other program data in the EPG 310. For each program, adjustment process 600 may very rapidly search the received frames for starring actor text, in the manner described above.

FIG. 4 is an embodiment that presents a basic methodology for the EPG aspect in accordance with the invention. Programming data for a program is received in block 740. In block 744, one or more starring actors are identified for the program separately from any programming data received in block 740. In block 748, starring actor data received with the programming data is adjusted utilizing identified starring actor data for the program in block 744. Such adjustment may be automatic or may selectively occur after a comparison between the names (and optionally the actor ranks) of received starring actors and identified starring actors. The adjusted data is made available for use with any other data received for the program in determining a recommendation of the program for the user in block 752. Such a recommendation may be a positive, negative or no recommendation.

While the invention has been described with reference to several embodiments, it will be understood by those skilled in the art that the invention is not limited to the specific forms shown and described. Thus, various changes in form and details may be made therein without departing from the spirit and scope of the invention as defined by the appended claims. For example, as noted there are many alternative techniques of text detection and recognition that may be utilized in the various embodiments, as well many different types of supporting recommender techniques that may be utilized. In addition, the recommender such as recommender 300 of FIG. 1 may be implemented as part of a television set, may be part of a set top box that interfaces with a television set, may be further upstream (for example, part of a website), or other like configuration. Similarly, the starring actor adjustment process 600 is shown as a separate module in recommender 300 in the embodiments discussed with respect to FIG. 1. It will be clear to one skilled in the art that implementation of the various processing tasks of this module as discussed above may be integrated with viewer profile generation process module 315, and/or the program recommendation generation process module 500.

In addition, the various modules supporting embodiments of the invention may be part of (and spread out amongst) a more expansive video or entertainment system. For example, adjustment processing 600 module may be implemented separately from the other modules of recommender 300 and utilize its own processor or processors. Thus, for example, a separate adjustment process for the starring actor data pertaining to user program choices 312 may be implemented upstream from the other modules of the recommender 300, and a separate adjustment process for EPG 310 may be implemented upstream from the other modules of the recommender 300. The other modules of the recommender and the adjustment processes may be performed at separate remote websites and then transmitted to a user's television, computer, or the like.

In addition, the above embodiments discussed above gave priority to the separately identified actors over the actors received with the program information. Alternatively, the recommender rules may give the received actor names priority. For example, separately identified actor(s) may be used as replacements only where they do not appear among the received actors and may only be used to replace one or a limited number of the lowest ranked fields. Such priority may be a function of rules pertaining to the reliability of the identified names.

Thus, the particular techniques described above are by way of example only and not to limit the scope of the invention.

What is claimed is:

1. A program recommender, comprising:

means for receiving electronic programming data for a program, wherein the electronic programming data includes one or more starring actor data fields relating to the program; and means for adjusting one or more of the starring actor data fields of the received electronic programming data according to separately identified (i) starring actor data and (ii) ranking of the identified starring actor data, said adjusting means utilizing a source separate from the received starring actor data fields to identify one or more starring actors in the program and a corresponding ranking of the identified one or more starring actors in the program, wherein the adjusted electronic programming data is made available for use in determining a viewer profile, an automated recommendation of the program, or both.

2. The recommender as in claim 1, wherein the adjusting means analyzes text content of a video of the program to identify the one or more starring actors in the program.

3. The recommender as in claim 1, wherein the adjusting means utilizes a database of programs to identify the one or more starring actors in the program.

4. The recommender as in claim 1, wherein the adjusting means inserts data of the one or more of the starring actors identified into a first one or more of the received starring actor data fields, respectively.

5. The recommender as in claim 1, wherein the adjusting means initially determines whether to adjust one or more of the starring actor data fields received with the program, prior to making electronic programming data available for use in determining the viewer profile, the automated recommendation of the program, or both.

6. The recommender as in claim 1, wherein the adjusting means selectively adjusts one or more of the received starring actor data fields based at least in part on a comparison between (i) data representative of the one or more of the identified starring actors and (ii) starring actors named in the one or more received starring actor data fields.

7. The recommender as in claim 6, wherein the comparison comprises determining the names of any of the one or more identified starring actors that also appear in the received starring actor data fields.

8. The recommender as in claim 1, wherein the recommender further comprises at least one processor and at least one associated memory configured to implement the receiving means and the adjusting means.

9. A method for processing electronic programming data received for a program for use in automated television program recommendations, the method comprising:

a) accessing, using a processor, a separate information source containing starring actor information for use in identifying starring actors for the program separately from any electronic programming data received;

b) determining, using the processor, whether the separate information source identifies (i) one or more starring actors in the program and (ii) a ranking of any separately identified one or more starring actors in the program;

c) adjusting, in a memory, one or more of starring actor data fields of the received electronic programming data using data representative of one or more of the identified starring actors if the separate information source contains the identity and ranking of one or more starring actors in the program; and d) making, in the memory, the adjusted starring actor data fields of the electronic programming data for the program available for use in an automated recommendation determination of the program.

10. The method as in claim 9, wherein accessing the separate information source comprises accessing a database in a memory.

11. The method as in claim 9, wherein adjusting the received data is further a function of whether the received electronic programming data for the program also includes one or more of the identified starring actors.

12. The method as in claim 9, wherein the method further comprises an initial determination performed by the processor of whether to adjust the received data prior to making the automated recommendation determination.

13. The method as in claim 9, wherein the method for processing electronic programming data is part of an automated television recommender.

\* \* \* \* \*